United States Patent
Brennan, III

(10) Patent No.: US 9,817,979 B2
(45) Date of Patent: Nov. 14, 2017

(54) PRIVATE DOMAIN NAME REGISTRATION

(75) Inventor: Charles Joseph Brennan, III, Reston, VA (US)

(73) Assignee: Network Solutions, LLC, Herndon, VA (US)

(*) Notice: Subject to any disclaimer, the term of this patent is extended or adjusted under 35 U.S.C. 154(b) by 0 days.

(21) Appl. No.: 13/480,750

(22) Filed: May 25, 2012

(65) Prior Publication Data

US 2013/0104229 A1    Apr. 25, 2013

Related U.S. Application Data

(63) Continuation of application No. 11/008,610, filed on Dec. 10, 2004, now abandoned.

(51) Int. Cl.
| | |
|---|---|
| G06F 15/16 | (2006.01) |
| G06F 21/60 | (2013.01) |
| H04L 29/12 | (2006.01) |
| H04L 12/58 | (2006.01) |
| G06F 21/56 | (2013.01) |

(52) U.S. Cl.
CPC .......... *G06F 21/60* (2013.01); *G06F 21/56* (2013.01); *H04L 29/12009* (2013.01); *H04L 29/12047* (2013.01); *H04L 51/12* (2013.01); *H04L 51/28* (2013.01); *H04L 61/15* (2013.01); *H04L 61/302* (2013.01); *H04L 61/303* (2013.01); *H04L 61/3015* (2013.01)

(58) Field of Classification Search
CPC .......... H04L 61/3015; H04L 61/302; H04L 61/3025; H04L 61/303
USPC .................................. 709/206, 218
See application file for complete search history.

(56) References Cited

U.S. PATENT DOCUMENTS

| | | |
|---|---|---|
| 6,044,205 A | 3/2000 | Reed et al. |
| 6,286,045 B1 | 9/2001 | Griffiths et al. |
| 6,308,203 B1 | 10/2001 | Itabashi et al. |
| 6,311,207 B1 | 10/2001 | Mighdoll et al. |
| 6,314,459 B1 | 11/2001 | Freeman |
| 6,321,267 B1 | 11/2001 | Donaldson |
| 6,330,605 B1 | 12/2001 | Christensen et al. |
| 6,345,294 B1 | 2/2002 | O'Toole et al. |
| 6,434,600 B2 | 8/2002 | Waite et al. |
| 6,446,133 B1 | 9/2002 | Tan et al. |
| 6,477,577 B1 | 11/2002 | Asano |
| 6,480,508 B1 | 11/2002 | Mwikalo et al. |

(Continued)

FOREIGN PATENT DOCUMENTS

| | | |
|---|---|---|
| GB | 2 347 053 | 8/2000 |
| JP | 10275119 | 10/1998 |

(Continued)

OTHER PUBLICATIONS

Hidden Whois by DomainSite.com, Nov. 19, 2003.*

(Continued)

*Primary Examiner* — Shirley Zhang
(74) *Attorney, Agent, or Firm* — Thomas | Horstemeyer, LLP

(57) ABSTRACT

A service for protecting the privacy of domain name registrants while preserving the registrant's ability to directly change the registration information or transfer the registration. A whois record is created that reflects the registrant's actual identity but contains contact information that is entirely associated with a privacy service.

15 Claims, 6 Drawing Sheets

(56) References Cited

U.S. PATENT DOCUMENTS

| | | | |
|---|---|---|---|
| 6,496,855 | B1 | 12/2002 | Hunt et al. |
| 6,519,589 | B2 | 2/2003 | Mann et al. |
| 6,675,208 | B1 | 1/2004 | Rai et al. |
| 6,687,746 | B1 | 2/2004 | Shuster et al. |
| 6,745,248 | B1 | 6/2004 | Gardos et al. |
| 6,880,007 | B1 | 4/2005 | Gardos et al. |
| 7,007,093 | B2 | 2/2006 | Spicer et al. |
| 7,130,878 | B2* | 10/2006 | Parsons et al. ............... 709/202 |
| 7,627,633 | B2* | 12/2009 | Rechterman et al. ........ 709/206 |
| 2001/0012378 | A1* | 8/2001 | Kanevsky et al. ............ 382/101 |
| 2001/0049745 | A1* | 12/2001 | Schoeffler ............... H04L 51/14 709/238 |
| 2002/0091827 | A1 | 7/2002 | King et al. |
| 2002/0178381 | A1 | 11/2002 | Lee et al. |
| 2004/0064561 | A1 | 4/2004 | Parsons et al. |
| 2004/0111480 | A1 | 6/2004 | Yue |
| 2005/0080642 | A1* | 4/2005 | Daniell ............... G06Q 10/107 709/206 |
| 2005/0289084 | A1 | 12/2005 | Thayer et al. |
| 2006/0031319 | A1* | 2/2006 | Nelson ................. G06Q 10/107 709/206 |
| 2006/0036690 | A1* | 2/2006 | O'Neil .................... H04L 51/12 709/206 |

FOREIGN PATENT DOCUMENTS

| | | |
|---|---|---|
| JP | 2001167017 | 6/2001 |
| JP | 2002063116 | 2/2002 |
| JP | 2002091874 | 3/2002 |
| JP | 2002297938 | 10/2002 |
| WO | 9906929 | 2/1999 |
| WO | 2004/021203 | 3/2004 |
| WO | 2004/029821 | 4/2004 |

OTHER PUBLICATIONS

Block,"Hidden Whois and Infringing Domain Names: Making the Case for Registrar Liability", U. Chi. Legal F. 431, 2008.

BNA,"ACPA Contributory Liability Claim Against Whois Proxy Service Will Proceed to Merits", pp. 1-5, May 27, 2009.

C.D. Cal.,"Order Denying Defendant Namecheap's Motion to Dismiss issued by US District Court for the Central District of California", pp. 1-44, May 19, 2009.

DeLoria et al.,"DMS service management", MILCOM, Conf. Record, IEEE, pp. 967-971, vol. 3, 1995.

DNSO Mailing List,"DNSO Mailing lists archives [registrars] Pattent on email changer and whois lookup", pp. 1-4, Jun. 3, 2002.

DNSO Mailing List,"DNSO Mailing lists archives [registrars] whois lookup", pp. 1-5, Jun. 3, 2002.

EasyDNS,"Why we do not offer Whois masking at easyDNS", easyDNS blog, available at http://blog .easydns.org/archives/247-Why-we-do-not-offer-Whois-masking-at-easyDNS.html (last visited Dec. 17, 2009), Nov. 20, 2008.

Hall,"How to Avoid Unwanted Email", ACM, vol. 41, No. 3, Mar. 1998.

HiddenRegistration,"Hidden Registration FAQ and Details", HiddenRegistration.com, Oct. 17, 2002.

ICANN,"Policy on Transfer of Registrations between Registrars", available at http://www.icann.org/en/transfers/policy-12jul04.htm (last accessed May 12, 2009); 6 pp., Jul. 12, 2004.

ICANN,"Policy on Transfer of Registrations between Registrars", Revision adopted Nov. 7, 2008, available at http://www.icann.org/en/transfers/policy-en.htm (last accessed May 12, 2009); 6 pp., Mar. 15, 2009.

ICANN,"Registrar Accreditation Agreement", available at http://www.icann.org/en/registrars/ra-agreement17may01.htm (last accessed May 12, 2009); 36 pp., May 17, 2001.

Jeftovic and easyDNS,"Whois Privacy brings a lawsuit down on Registrar", available at http://www.privateworld.com/archives/215-Whois-Privacy-brings-a-lawsuit-down-on-Registrar.html (last visited Dec. 17, 2009), May 29, 2009.

Namescout.com,"Privacy Protection", http://namescout.com/master/privacyfeatures.asp, pp. 1-2, Sep. 13, 2005.

Smith et al.,"Operating firewalls outside the LAN perimeter", IEEE, pp. 493-498, 1999.

US District Court,"Order issued by US District Court for the Southern District of Florida", Case No. 09-60973-CIV-AL Tonaga/Brown, pp. 1-25, Dec. 4, 2009.

Zenel,"A general purpose proxy filtering mechanism applied to the mobile environment", Wireless Network, pp. 391-409, 1999.

\* cited by examiner

WHOIS RECORD FOR comicsetc.com — 102

Certified Offer Service -- Make an offer on this domain
Backorder -- Try to get this name when it becomes available
Private Registration -- Make personal information for this domain private
Similar Names -- See suggested alternatives for this domain Registrant:
Brennan, Charles — 103
(BBYGKFAZVI)
1956 Barton Hill Rd.
Reston, VA 20191
US
Phone: 571-259-3242 — 105
Fax: 123 123 1234
Domain Name: COMICSETC.COM — 102

Make this info private

101

Administrative Contact:
Brennan, Charles — 107
(BBYGKFAZVI)
chuckbrennan@yahoo.com — 109
1956 Barton Hill Rd.
Reston, VA 20191
US
Phone: 571-259-3242 — 111
Fax: 123 123 1234

106

Technical Contact:
Network Solutions, LLC (HOST-ORG) — 108
customerservice@networksolutions.com
13200 Woodland Park Drive — 110
Herndon, VA 20171-03025
US
Phone: 1-888-642-9675 — 112
Fax: 571-434-4620

Record expires on 27-Nov-2005
Record created on 13-Oct-2004
Database last updated on 14-Oct-2004

Domain servers in listed order:       Manage DNS

NS1.DOMAINHOP.COM                     65.169.109.25
NS2.DOMAINHOP.COM                     65.169.106.26

Show underlying registry data for this record

FIG. 1
(prior art)

WHOIS Example - Domains By Proxy                                                                Page 1 of 1

> ICANN, the international governing body for domain names, requires every Registrar to maintain a publicly accessible "WHOIS" database displaying all contact information for all domain names registered.

> Example: John Smith lives at 1234 Elm Street, Hometown AZ 85000. His home phone is 480-555-5555. He buys "ProxiedDomain.com".
> - With a public registration, John's personal information is available for anyone to see.
> - With a private registration, John's personal information is shielded from public display, and a private email address allows John to control who reaches him.

Public Registration WHOIS Listing

Registrant:
John Smith
1234 Elm Street
Hometown, AZ 85000
Registered through: Domains Priced Right
Domain Name: ProxiedDomain.com
Created on: 15-Oct-02
Expires on: 15-Oct-03
Last Updated on: 17-Oct-02
Administrative Contact:
John Smith
john@ProxiedDomain.com
1234 Elm Street
Hometown, AZ 85000
(480) 555-5555
Technical Contact:
John Smith
john@ProxiedDomain.com
1234 Elm Street
Hometown, AZ 85000
(480) 555-5555

Private Registration WHOIS Listing

Registrant:
Domains By Proxy, Inc.
15111 N. Hayden Road Suite 160/PMB 353
Scottsdale, AZ 85260
Registered through: Domains Priced Right
Domain Name: ProxiedDomain.com
Created on: 15-Oct-02
Expires on: 15-Oct-03
Last Updated on: 17-Oct-02
Administrative Contact:
Domains By Proxy, Inc.
ProxiedDomain.com@DomainsByProxy.com
15111 N. Hayden Road Suite 160/PMB 353
Scottsdale, AZ 85260
(480) 624-2599
Technical Contact:
Domains By Proxy, Inc.
ProxiedDomain.com@DomainsByProxy.com
15111 N. Hayden Road Suite 160/PMB 353
Scottsdale, AZ 85260
(480) 624-2599

[ Close ]

FIGURE 2                                    PRIOR ART http://www.domainsbyproxy.com/popup/whoisexample.aspx?se=%2B                            12/9/2004

WHOIS RECORD FOR novaaffiliatemarketing.com

Certified Offer Service – Make an offer on this domain
Backorder – Try to get this name when it becomes available
Similar Names – See suggested alternatives for this domain

Registrant:
Brennan, Charles — 501

ATTN: NOVAAFFILIATEMARKETING.COM
c/o Network Solutions
P.O. Box 447
Herndon, VA 20172-0447
Phone: 570-708-8780          — 502

Domain Name: NOVAAFFILIATEMARKETING.COM

Administrative Contact:
Brennan, Charles — 503 ckbpa96x7qm@networksolutionsprivateregistration.com
ATTN: NOVAAFFILIATEMARKETING.COM
c/o Network Solutions
P.O. Box 447
Herndon, VA 20172-0447
Phone: 570-708-8780          — 504

Technical Contact:
Network Solutions, LLC (HOST-ORG) — 505 customerservice@networksolutions.com
13200 Woodland Park Drive
Herndon, VA 20171-03025
US
Phone: 1-888-642-9675
Fax: 571-434-4620            — 506

Record expires on 14-Dec-2004
Record created on 14-Dec-2003
Database last updated on 31-Oct-2004

Domain servers in listed order:      Manage DNS

NS1.WORLDNIC.COM         216.168.228.3
NS2.WORLDNIC.COM         216.168.225.132

This listing is a Network Solutions Private Registration. Mail correspondence to this address must be sent via USPS Express Mail™ or USPS Certified Mail®; all other mail will not be processed. Be sure to include the registrant's domain name in the address.

FIG. 5

PRIVATE DOMAIN NAME REGISTRATION

BACKGROUND OF THE INVENTION

The Internet Corporation for Assigned Names and Numbers ("ICANN") governs the registration of certain types of domain names on the Internet. It accredits registrars and promulgates policies on domain name registration. One of its policies mandates that each registrar maintain a publicly-accessible database (a "whois" database) that lists the name of, and contact information for, each of registrants for each domain name registered at that registrar. See ICANN Registrar Accreditation Agreement, Approved May 17, 2001, Section 3.3.

An example of a portion of a domain name registration record in a whois database is shown in FIG. 1. Registrant information 101 of domain name 102 includes the registrant name 103, postal mail address 104, telephone number 105. The administrative and technical information 106 includes the administrative contact name 107 and technical contact name 108, administrative contact e-mail address 109, technical contact e-mail address 110, administrative contact telephone number 111 and technical contact telephone number 112.

A registrant may wish to keep private certain of the information that is publicly available in the whois database, such as telephone numbers, e-mail addresses, mail addresses, etc. For example, publicly available e-mail addresses in the whois database are mined by SPAMmers. As a result, such e-mail addresses can receive substantial amounts of unsolicited commercial e-mail ("SPAM"). In response to the need to keep domain name registration information private, certain registrars offer services designed to shield such information.

One known domain name registration privacy service called SPAM Shield is offered by the registrar Dotster, Inc. The SPAM Shield service replaces a registrant's e-mail address in a whois record with a SPAM Shield e-mail address. E-mail received at the SPAM Shield address is filtered for SPAM before being forwarded to an e-mail address designated by the registrant. To further confound data miners, the SPAM Shield e-mail address in the whois record is changed every ten days.

Another known domain name registration privacy service is offered by Domains by Proxy, Inc. The registrant of a domain name subscribes to the Domain by Proxy service, which replaces all of the registrant's registrant, administrative and technical information in the whois entry for the domain name registration with Domain by Proxy information. FIG. 2 shows a comparison of publicly available whois information 201 and what is shown when the registrant subscribes to the Domains by Proxy service 202. Domains by Proxy is contractually bound to the subscriber to dispose of the domain name registration in accordance with the subscriber's instructions.

The Domains by Proxy service is described in International Patent Application numbers WO 2004/029821, "Proxy E-mail Method and System" and WO 2004/021203, "Method and System for Domain Name Registration and E-mail by Proxy." The registrant essentially transfers the domain name registration to Domains by Proxy. The registrant thereby becomes a "subscriber" to the privacy service, which is contractually bound to act at the subscriber's behest as the registrant of the domain name.

When correspondence is addressed to the registrant of the domain name, the Domains by Proxy service offers to forward it to the subscriber. First class postal mail (other than legal notices), "junk" mail or other unsolicited communications (regardless of their mode of delivery) are discarded or returned to the sender by the privacy service.

Domains by Proxy creates an e-mail address that is accessible to the subscriber for each registered domain name ("DOMAIN_NAME") of the format DOMAIN_NAME@domainsbyproxy.com (the "DBP account"). E-mails received at each such address are either forwarded to the subscriber as-is; filtered for SPAM and forwarded; or discarded, as elected in advance by the subscriber.

When Domains by Proxy receives certified or traceable courier mail or legal notices addressed to the subscriber's contact information found in his domain name registration, it sends an e-mail message to the subscriber's DBP account. The e-mail message identifies the sender of the correspondence, the date Domains by Proxy received it, and a brief description of its contents. The subscriber is given seventy-two hours to decide whether to reject the correspondence or have it forwarded via overnight courier, facsimile, or both, at the subscriber's expense. Should the subscriber not respond to the Domains by Proxy e-mail message, Domains by Proxy attempts to contact the subscriber via telephone. If the subscriber does not respond and is unreachable, Domains by Proxy reserves the right to immediately reveal the subscriber's identity and/or cancel the subscriber's private registration service. In that case, the subscriber once again becomes the registrant of the domain name, and the whois directory reverts to displaying the registrant's true registration name and contact information, including the registrant's identity, postal address, e-mail address and phone number.

In the Domains by Proxy scheme, making changes to the domain name registration can be cumbersome because Domains by Proxy is the registrant, albeit contractually bound to act in accordance with the subscriber's instructions with regard to the domain name registration. Thus, the subscriber cannot directly make any changes to the registration or registration information, e.g., using the registrar's account management utilities. Rather, the subscriber must instruct Domains by Proxy to make any change, which Domains by Proxy must then carry out.

For example, transferring a domain name registration from a first registrar (a "Losing Registrar") to a second registrar (a "Gaining Registrar") must be done by the administrative contact or registered name as shown in the whois record for the domain name registration. All accredited domain name registrars must comply with the ICANN Policy on Transfer of Registrations between Registrars, dated 12 Jul. 2004 ("ICANN Transfer Policy.") The Policy states, "The Administrative Contact and the Registered Name Holder, as listed in the Losing Registrar's or applicable Registry's (where available) publicly accessible WHOIS service are the only parties that have the authority to approve or deny a transfer request to the Gaining Registrar. In the event of a dispute, the Registered Name Holder's authority supersedes that of the Administrative Contact." ICANN Transfer Policy, Section 1.1. Ordinarily, transferring a registration is done directly by the actual registrant of the domain name.

Thus, only Domains by Proxy can transfer a domain name registration from a Losing Registrar to a Gaining Registrar. A subscriber wishing to do so must instruct Domains by Proxy to make the transfer, and provide the necessary information and authorization to Domains by Proxy. Alternatively, the subscriber can cancel its Domains by Proxy service and become the registrant for the domain name, and then transfer the domain name registration himself. However, in so doing, his registration information will become publicly available in the whois record for the domain name registration.

A better domain name registration privacy system would protect the registrant's sensitive information while allowing him to manipulate the registration (e.g., transfer, change registration information, etc.) directly, without proceeding through a privacy service.

SUMMARY OF THE INVENTION

In accordance with an embodiment of the present invention, each and every of the postal mail address, telephone number and e-mail address of a registrant in a whois record can all be changed to an alternate postal mail address, telephone number and e-mail address, while the registrant name in the whois record remains the actual identity of the registrant. The alternate contact information can point to a privacy service, which can handle communications addressed to such alternate contacts on behalf of the registrant. This combination can maintain the privacy of the registrant contact information, while permitting the registrant to retain control over the domain name registration, because in this way, the actual registrant (rather than a proxy service) remains the legal registrant of the domain name registration. For example, the registrant can directly approve the transfer of the registration to a Gaining Registrar in accordance with the ICANN Policy on Transfer of Registrations between Registrars. A registrant can also make changes to the registrant information listed in the whois record directly through the domain registrar's account manager, without having to act through a privacy service.

BRIEF DESCRIPTION OF THE DRAWINGS

FIG. 1 shows a prior art embodiment of a whois record.

FIG. 2 shows a prior art comparison of whois records using Domains by Proxy.

FIG. 5 shows a whois record in accordance with an embodiment of the present invention.

DETAILED DESCRIPTION

Figure 3:
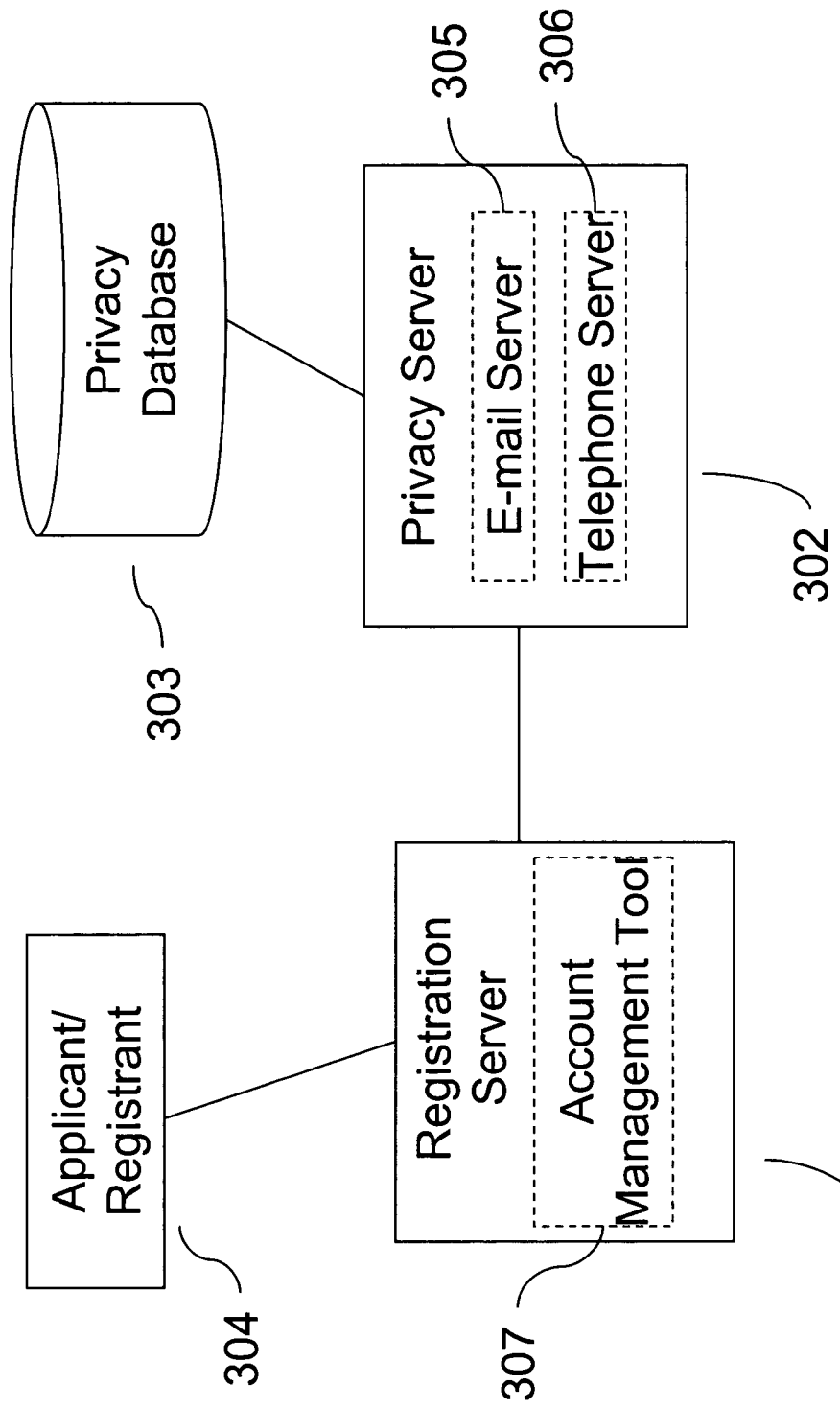
FIG. 3 shows a system in accordance with an embodiment of the present invention.

In accordance with an embodiment of the invention, the whois record for a domain name registration is configured such that the registrant name reflects the true identity of the registrant, while the registrant contact information is entirely replaced by alternate contact information. As used herein, "contact information" includes postal mail address(es), e-mail address(es) and telephone number that are displayed in a whois record. A "contact" is an individual address displayed in a whois record, and can include a postal address, e-mail address and/or a telephone number. "Correspondence" is any communication addressed to any contact information.

The registrant's actual e-mail address can be replaced by an alternate e-mail address that can be changed periodically to defeat data miners. E-mail received at the alternate address can be filtered for SPAM and/or malicious code (such as viruses, worms, etc.) and then forwarded to an e-mail address designated by the registrant.

The registrant's postal address can be replaced by an alternate address, such as a Post Office Box maintained by a registrar. Postal mail addressed to the alternate address can be handled in accordance with any suitable regime, e.g., depending on the identity of the sender, the mode of delivery, the content of the correspondence, etc. For example, United States Postal Service ("USPS") Certified™ and Express Mail® can be opened by the privacy service and forwarded to the registrant by a variety of methods. For example, such opened mail can be scanned and forwarded to the registrant's e-mail account electronically. Such mail can also be forwarded to a postal address designated by the registrant. Third Class and Bulk mail can be destroyed upon receipt, unopened. All other mail can be returned to the sender, unopened.

A sender list can be maintained for each registrant. The sender list can include classes of senders with forwarding instructions. For example, for postal mail, the sender list can include a "scan and forward" class; a "forward in hard copy" class; etc. The privacy service can determine what action to take with regard to a piece of correspondence based upon the class to which the sender belongs. Examples of an entry in a sender class include the full name and address of a sender; the name only of a sender; the corporate affiliation only of a sender; a geographic origin indicator of the sender (e.g., a zip code, a state, a street name, etc.) For e-mail, the sender list can include a sender e-mail address (e.g., phillipz@acme.com); a sender domain (e.g., forward all e-mail from acme.com); etc. For telephone forwarding, the sender lists can include originating telephone numbers, which can be obtained using known caller-ID technology; originating area codes, etc. If sender information for a given received communication is not included in a sender list, then a default rule can be applied, e.g., block the attempted communication with the registrant. The sender list can be implemented automatically by storing it in a database that can be automatically queried upon receipt of an e-mail or telephone call.

Similarly, a registrant can designate a code (e.g., a number) that is correlated to a rule specifying the action to take with regard to the correspondence. Such a code can be included in the postal address (e.g., attn: 14535); in the subject line of an e-mail; entered through a telephone keypad at the prompting of an Interactive Voice Response ("IVR") system; etc. The rule associated with a code can be "forward immediately"; "forward via first class mail"; "forward via overnight courier"; etc.

The alternate telephone number displayed in the whois entry can be answered by an answering service that instructs the caller how to contact the registrant. For example, the answering service can instruct the caller to contact the registrant via a given e-mail address; a postal address; etc. The provided e-mail and/or postal addresses can be alternate addresses, such as those displayed in the whois record. Alternatively, an incoming telephone number can be forwarded using call-forwarding technology, e.g., if the incoming call originates from a number that the registrant has instructed to be forwarded to a given number. The originating number can be detected by the privacy service using caller-ID technology.

The privacy service in accordance with the present invention can be offered by a domain name registrar directly, or by a privacy service provide in conjunction with a domain name registrar. A registrant can cancel the privacy service at any time, in which case the alternate contact information in the whois record will be changed to the registrant's contact information.

An embodiment of a system in accordance with the present invention is shown in FIG. 3. A registration server 301 is coupled to a privacy server 302 and a privacy database 303. The registration server 301 can receive from an applicant 304 a request to register a domain name using a privacy service in accordance with an embodiment of the present invention. The registration server 301 can collect the applicant's 304 name and contact information, and then can register the domain name (the applicant 304 thus becomes the registrant 304) with the registrant's name and alternate contact information. A record including the registrant's 304 domain name, name, contact information and privacy services preferences can be stored at privacy database 302. The registrant's 304 preferences can include a sender list, correspondence forwarding options, alternate registrant contact information (i.e., alternate addresses at which the registrant 304 can be contacted directly), an indication as to whether the registrant 304 has elected to have the domain name registration automatically renewed, payment information (such as a credit card number), etc.

The registration server 301, privacy server 302 and privacy database 303 can each be implemented in a different computer, can be implemented in two computers, or a single computer. The functions performed by each can be implemented in any way so as best to suit the needs and capabilities of the implementer.

Privacy server 302 can include a SMTP e-mail server 305 that serves as the destination address for e-mail messages sent to an alternate e-mail address maintained by the privacy service, as well as computer software for scanning e-mail messages and their attachments to determine if an e-mail message is likely to be SPAM or if it contains malicious code. When an e-mail message is received at the e-mail server 305, the privacy server can query the privacy database 303 to determine the forwarding instructions of the registrant. If the registrant has indicated that no e-mail messages are to be forwarded, then the received e-mail message can be deleted. If the registrant has provided a forwarding e-mail address, then the e-mail server 305 can scan the e-mail. If the e-mail server 305 determines that the message is not SPAM and does not include malicious code, then the received message can be forwarded to the registrant in accordance with the registrant's instructions. If SPAM or malicious code is detected, then the message can be deleted. A message with a summary of deleted e-mail messages directed to the alternate e-mail address of the registrant can be periodically sent to the registrant.

Privacy server 302 can also include a telephone server 306 adapted to receive telephone calls directed to the alternate telephone number for a domain name registration. The telephone server 306 can include an answering service that plays a pre-recorded message directing the caller to contact the registrant via other means. It can also include an Interactive Voice Response ("IVR") system for collecting further information from a calling party and then directing the calling party to alternate contact means, such as postal mail or e-mail. The telephone server 306 can also include call forwarding hardware and software. Upon receiving an incoming call, the telephone server 306 can query the privacy database 303 and obtain a forwarding telephone number for incoming calls to a registrant's alternate telephone number. The telephone server 306 can forward a call to another number.

If the registrant wants to modify any domain name registration information, the registrant can change the registrant name, or selectively or entirely replace any and all alternate contact information by using an account management tool 307 at the registration server 301. Similarly, the registrant can transfer the domain name registration directly by using the account management tool 307 at the registration server 301.

Figure 4:
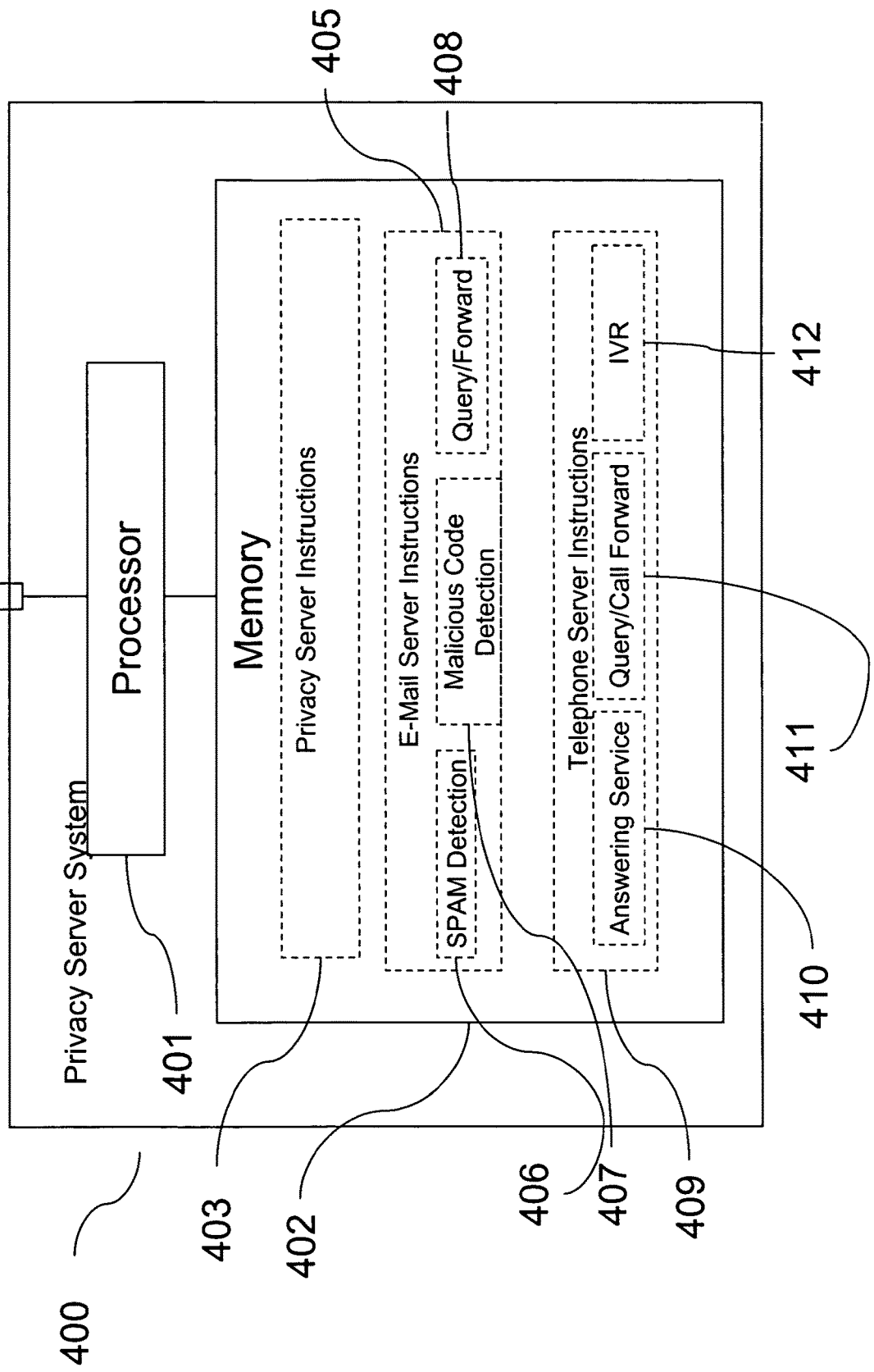
FIG. 4 shows a method in accordance with an embodiment of the present invention.

A privacy server system 400 in accordance with an embodiment of the present invention is shown in FIG. 4. Processor 401 can be coupled to memory 402, which can store privacy instructions 403 that can be adapted to be executed by processor 401 to perform the method in accordance with an embodiment of the present invention. For example, privacy instructions 403 executing on processor 401 can receive a request for private registration for a domain name from a registration server. The request can include the registrant's name and contact information. The executing privacy instructions 403 can cause the domain name to be registered with the registrant's name and entirely with alternate contact information. Processor 401 can be coupled to port 404.

The privacy server system can include e-mail server instructions 405 that can implement SMTP and can include e-mail scanning software that can detect SPAM 406 and/or malicious code 407. This can be implemented using the same processor 401 and memory 402 as the privacy instructions 403, or can be implemented on a separate processor and memory in communication with a privacy server processor 401 and memory 402. The e-mail server 404 can include query and forwarding instructions 408 that can query the privacy database (not shown) to discover forwarding e-mail addresses and other forwarding instructions, and can forward or delete e-mail messages. If a message received at the e-mail server 404 is discovered to be SPAM or contain malicious code, it can be deleted and not forwarded to the registrant.

The privacy server system can include telephone server instructions 409 that can receive calls made to a registrant telephone number, and can include an automatic answering service instructions 401 that deliver a message to each calling party. Telephone server instructions 409 can also include query/call forward instructions 411 that can query the privacy database (not shown) to obtain consult call-forward rules and obtain call-forward information, and then forward a call received at an alternate telephone number to a registrant telephone number. Telephone server instructions 409 can also include IVR instructions 412 that can gather additional information from a calling party. Telephone server instructions 409 can be implemented using the same processor 401 and memory 402 as used by privacy instructions 403, or may be implemented by a separate processor and memory in communication with processor 401 and memory 402.

An example of a portion of a whois record in accordance with an embodiment of the present invention is shown in FIG. 5. The actual name of the registrant is shown 501, while the contact information shown in the whois record is entirely alternate contact information 502. As can be seen from FIG. 5, the same technique in accordance with an embodiment of the present invention can be implemented for the administrative contact. That is, the administrative contact name 503 can be the actual name of the administrative contact (rather than some alternate contact information), while the rest of the administrative contact information is alternate contact information 504. Likewise, the technical contact name 505 can be the actual contact name, while the rest of the technical contact information can be alternate contact information 506.

Figure 6:
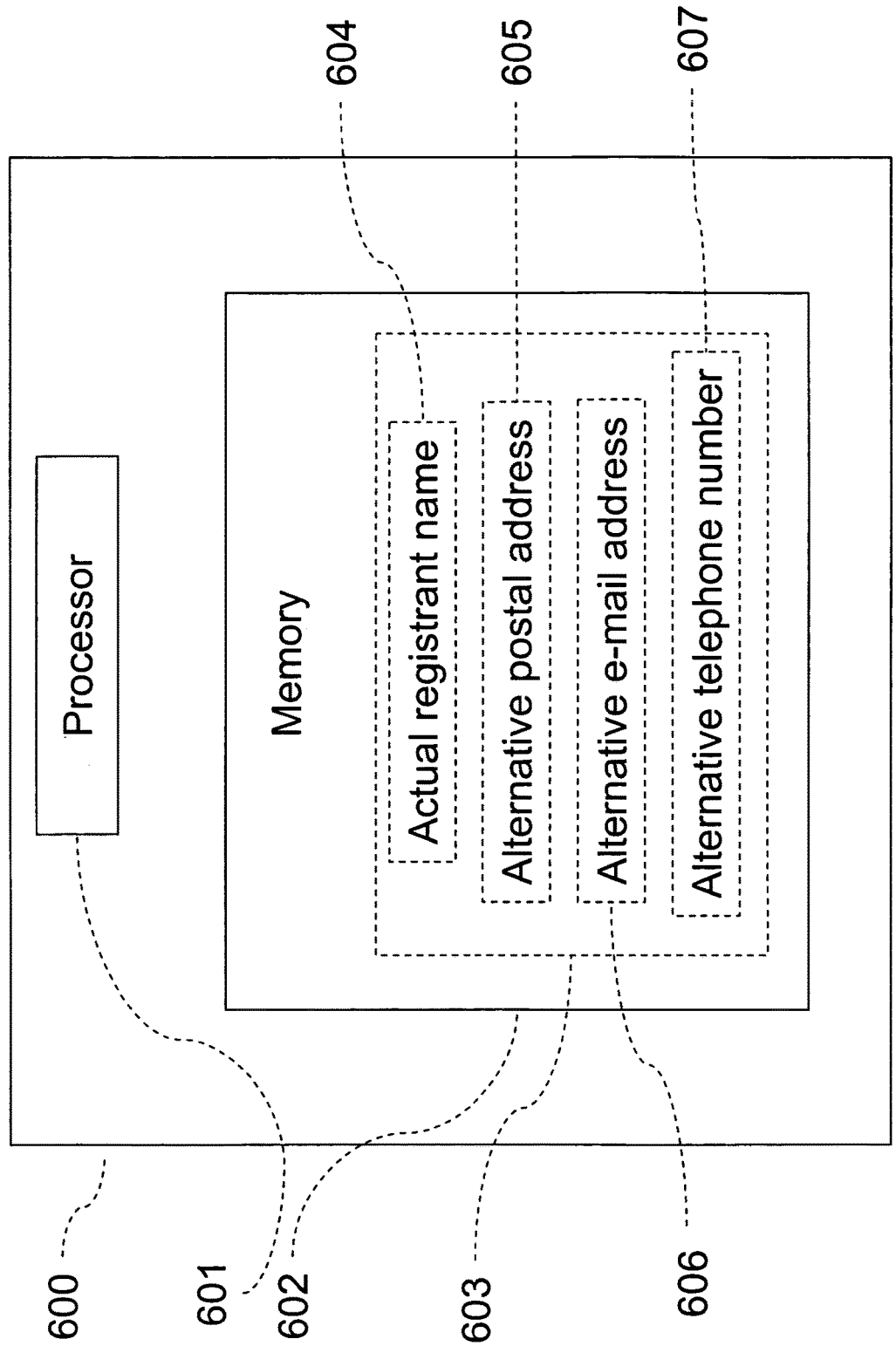
FIG. 6 is an apparatus in accordance with an embodiment of the present invention.

FIG. 6 shows an embodiment of an apparatus 600 storing a data structure in accordance with an embodiment of the present invention. The apparatus includes a processor 601 coupled to memory 602 storing a whois record 603 that includes a registrant name 604 that is the actual name of a registrant of a domain name, an alternate postal address 605, an alternate e-mail address 606 and an alternate telephone number 607.

The above description is meant to illustrate and not limit the scope of the present invention, which is fully defined by the scope of the claims. Those of skill in the art will recognize that the above description includes examples of how the present invention may be implemented, and will understand from the above description how to implement other embodiments that are within the scope of the claims.

What is claimed:

1. A method for protecting the privacy of a registrant of a domain name, comprising:
    creating, via at least one computing device, a whois record for a domain name registration for the registrant;
    assigning, via the at least one computing device, a registrant name displayed in the whois record with an actual registrant name of the registrant;
    assigning, via the at least one computing device, contact information displayed in the whois record with entirely alternate contact information, the alternate contact information being different from actual contact information associated with the actual registrant name;
    receiving, via the at least one computing device, a plurality of predetermined rules designated by the registrant, individual predetermined rules of the plurality of predetermined rules specifying a respective forwarding action associated with a sender class of a sender of a correspondence for the registrant sent via the alternate contact information;
    receiving the correspondence for the registrant sent via the alternate contact information; identifying, via the at least one computing device, the sender class of the sender of the correspondence;
    identifying, via the at least one computing device, a particular forwarding action of the correspondence based at least in part on the sender class, an identified code within the correspondence, and the plurality of predetermined rules, the identified code comprises at least one of at least a portion of a postal address, at least a portion of a subject line, or a number provided via a telephone keypad; and
    initiating, via the at least one computing device, the particular forwarding action of the correspondence to the registrant in response to determining the respective forwarding action for the sender class.

2. The method of claim 1, wherein the particular forwarding action further comprises forwarding the correspondence to a registrant contact, the alternate contact being associated with the alternate contact information and the registrant contact being associated with the actual registrant name.

3. The method of claim 2, wherein the correspondence comprises postal correspondence and the method further comprises:
    scanning the postal correspondence; and forwarding, via the at least one computing device, the scanned postal correspondence to a registrant e-mail address in response to determining that the sender of the postal correspondence is included in the sender class associated with a predetermined scan and forward rule of the plurality of predetermined rules, the alternate contact being associated with the alternate contact information and the registrant e-mail address being associated with the actual contact information.

4. The method of claim 1, wherein, according to the plurality of predetermined rules, an e-mail message received at an alternate email address is scanned and forwarded to a registrant e-mail address if it is determined not to be SPAM and if it is determined not to contain malicious code.

5. The method of claim 1, wherein the registrant is a legal registrant of the domain name.

6. The method of claim 1, further comprising implementing, via the at least one computing device, a change in the contact information listed in the whois record based at least in part on a request received directly from the registrant.

7. The method of claim 1, further comprising:
    configuring, via the at least one computing device, the whois record such that a technical contact name displayed in the whois record is an actual name of a technical contact person and contact information displayed for the technical contact in the whois record is entirely alternate contact information, the alternate contact information being different from actual contact information of the technical contact.

8. An apparatus for protecting the privacy of a registrant of a domain name, comprising:
    a processor;
    a memory coupled to said processor; and
    instructions executable by the processor, wherein, when executed, the instructions cause the processor to at least:
    generate a whois record for a domain name registration, the whois record including a registrant name and contact information, the registrant name being a name of an actual registrant and the contact information being an alternate contact information from an actual contact information of the actual registrant, and the registrant being a legal registrant of the domain name;
    receive a plurality of predetermined rules designated by the registrant, individual predetermined rules of the plurality of predetermined rules specifying a respective action associated with a respective sender class of a sender of a received correspondence for the registrant name via the alternate contact information;
    store the whois record and plurality of predetermined rules in said memory receive the received correspondence for the registrant name from the sender;
    identify a particular forwarding action of the received correspondence based at least in part on the respective sender class of the received correspondence, an identified code within the received correspondence, and the plurality of predetermined rules, the identified code comprising at least one of at least a portion of a postal address, at least a portion of a subject line, or a number provided via a telephone keypad; and
    forward the received correspondence to the registrant according to the respective forwarding action.

9. The apparatus of claim 8, wherein the received correspondence comprises an e-mail message and receiving and forwarding the received correspondence further comprises:
    receiving the e-mail message addressed to an alternate e-mail address listed in a whois record;
    scanning the e-mail message for SPAM; and
    forwarding the e-mail message to an e-mail address specified by the registrant in accordance to at least one predetermined rule associated with the respective sender class if the e-mail message is determined not to be SPAM.

10. The apparatus of claim 8, wherein the received correspondence comprises an e-mail message and receiving and forwarding the received correspondence further comprises:
- receiving the e-mail message addressed to an alternate e-mail address listed in a whois record;
- scanning the e-mail message to determine if the e-mail message contains malicious code; and
- forwarding the e-mail message to an e-mail address specified by the registrant in accordance to at least one predefined rule associated with the respective sender class if the e-mail message is determined not to contain malicious code.

11. The apparatus of claim 8, wherein the received correspondence comprises a telephone call and receiving and forwarding the received correspondence further comprises:
- answering the telephone call to an alternate telephone number; and
- providing a prerecorded message to the calling party according to at least one predetermined rule associated with the respective sender class.

12. The apparatus of claim 8, wherein the received correspondence comprises an email message and receiving and forwarding the received correspondence further comprises:
- receiving the e-mail message addressed to an alternate e-mail address listed in a whois record;
- scanning the e-mail message for at least one of SPAM or malicious code; and
- deleting the e-mail message in response to identifying SPAM or malicious code.

13. The apparatus of claim 8, wherein the received correspondence comprises an email message and receiving and forwarding the received correspondence further comprises:
- generating a summary of one or more deleted e-mail messages directed to an alternate e-mail address; and
- sending the summary to the actual registrant using the actual contact information.

14. A non-transitory computer-readable storage medium storing instructions executable by a processor, wherein, when executed, the instructions cause the processor to at least:
- create a whois record for a domain registration, a registrant name displayed in the whois record being an actual registrant name of an actual registrant and contact information displayed in the whois record being entirely alternate contact information from an actual contact information of the actual registrant;
- receive a plurality of predetermined rules designated by the actual registrant, individual predetermined rules of the plurality of predetermined rules specifying a respective forwarding action associated with a sender class of a sender associated with correspondence that is received using the alternate contact information, a first action associated with a first sender class being different from a second action associated with a second sender class;
- receive a correspondence using the alternate contact information;
- identify a particular forwarding action of the received correspondence based at least in part on the respective sender class of the received correspondence, an identified code within the received correspondence, and the plurality of predetermined rules, the identified code comprises at least one of at least a portion of a postal address, at least a portion of a subject line, or a number provided via a telephone keypad; and forward the received correspondence to the registrant according to the respective forwarding action.

15. The non-transitory computer-readable storage medium of claim 14, wherein, when executed, said instructions further cause said processor to at least:
- identify a particular predetermined rule associated with the sender class and the identified code; and
- according to the particular predetermined rule: scan the postal correspondence; and
- forward the scanned postal correspondence to a registrant e-mail address associated with actual contact information of the actual registrant.

\* \* \* \* \*